Sept. 11, 1951   J. J. BRELL   2,567,543
RETAINING RING
Filed March 25, 1948
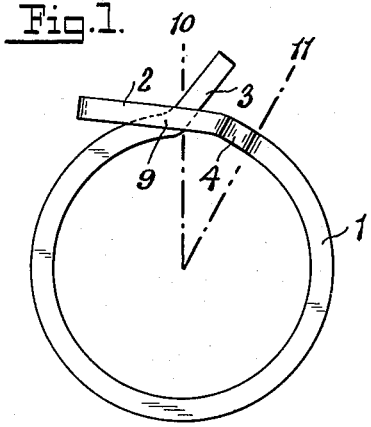
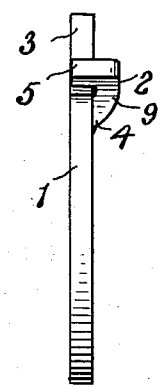
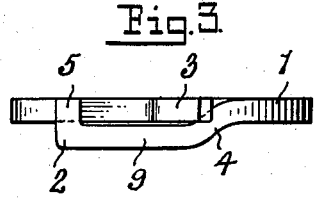
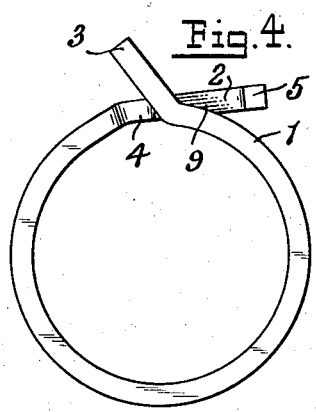
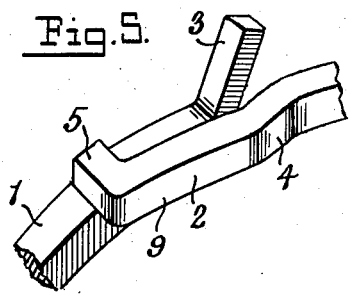
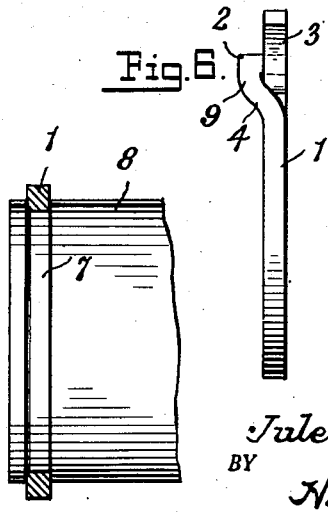
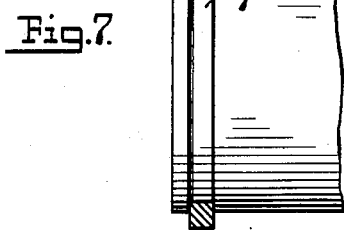
INVENTOR.
Jules J. Brell
BY
Harry Rdzinsky
Attorney Patented Sept. 11, 1951

2,567,543

UNITED STATES PATENT OFFICE 2,567,543

RETAINING RING

Jules J. Brell, Baldwin, N. Y.

Application March 25, 1948, Serial No. 17,049

4 Claims. (Cl. 85—8.5)

This invention relates to retaining rings and particularly to those which are fitted upon shafts or other cylindrical elements for maintaining gears, bearings, bushings or other articles or parts thereon, such rings thus taking the place of cotter pins, nuts, screw-fastened collars and other commonly-used fastening devices.

An object of the present invention is to provide in a ring of this character, means by which the insertion of the ring in a groove formed in a shaft or other element, as well as the removal of such a ring is greatly facilitated and can be effected without the employment of special tools. With the ring of the present invention, a simple, and readily-available tool such as a pair of pliers of almost any known form, is all that is required for applying and removing the ring.

Another object of the invention is to provide a ring of this character which can be speedily and inexpensively fabricated from strip stock, thus greatly decreasing the manufacturing cost of the ring.

Still another object of the invention is to provide a ring of this character provided at its ends with projecting elements so arranged and disposed that when the ring is seated in a groove, such elements will be in a position to enable them to be easily reached and engaged between the jaws of a pair of pliers of known shape, thereby enabling the ring to be spread or expanded to permit it to be easily removed from the groove.

Another object of the invention is to provide, in a ring of this character, stop means for limiting the extent of expansion of the ring when it is engaged and expanded by pliers or other tools.

These and other objects are attained by the invention, a more particular description of which will hereinafter appear and be set forth in the claims appended hereto.

In the accompanying drawing, wherein an illustrative embodiment of the invention is disclosed, Fig. 1 is a side elevation of a retaining ring constructed in accordance with the invention;

Fig. 2 is an edge view of the ring, looking at the left side of Fig. 1;

Fig. 3 is a top plan view of the ring;

Fig. 4 is a face view of the ring looking at the side opposite to that shown in Fig. 1;

Fig. 5 is a perspective view showing the end portions of the ring;

Fig. 6 is an edge view of the ring, looking at the right side of Fig. 1, and

Fig. 7 is a sectional view through a ring as applied in a groove in a cylindrical shaft or similar article.

Rings of the character described are especially adapted for use upon shafts and other cylindrical objects, an example of which is shown at 8 in Fig. 7, wherein the shaft is provided with a circumferential groove 7 into which the ring 1 is sprung or snapped to thereby form a shoulder or abutment to serve in the capacity of a nut, cotter pin or other stop member on the shaft.

A ring constructed in accordance with the invention is shown in Figs. 1 to 6 inclusive, wherein it will be noted that the body of the ring is preferably formed of a length of spring metal formed into circular shape, with its ends in overlapping relation. One of said ends is indicated at 3, and it will be noted that the same consists of an angular extension projecting outwardly from the body of the ring. This end 3 is maintained in the same plane as the body of the ring. The second end, indicated at 2, also extends angularly for a relatively short distance, as indicated at 4, and is then off-set as at 9, to overlap and pass along one side of the other end 3 of the ring. The angularity of the off-set portion of the end 2 may, if desired be less than the angle of the portion 4. At its extremity, the off-set end portion 9 is formed with a laterally bent end or lug portion 5 which extends transversely of the body of the ring, but does not project beyond the face of the ring at that side of the ring which is remote from the off-set portion 9.

The arrangement of the tangential ends 2 and 3 of the ring is such that the ring is circular for approximately 330 degrees, the non-arcuate portion of the ring or that located between the dotted lines 10 and 11 in Fig. 1, comprising approximately 30 degrees.

As will be noted from Figs. 2, 3 and 6, nearly all the curved body of the ring is arranged in the same plane so that when the ring is fitted into an annular groove of uniform width, and which groove can be of a width closely conforming to the cross-sectional size of the strip from which the ring is made, all of the ring, with the exception of the parts 2, 3, 4 and 5 will be contained within the groove and will present a flat, annular shoulder out of the groove for the greater part of the ring and for at least more than one half of the circumference of the ring.

From the foregoing, the operation of the ring will be readily apparent. Since the two ends 2 and 3 depart from the arcuate curvature of the balance of the ring and extend out angularly, the same constitute abutments which can be readily engaged between the jaws of a pair of pliers or other like gripping tool, one jaw of such tool engaging against the projecting end 3 and the other engaging against the lug portion 5 on the end 2. When the jaws of the tool are moved toward one another, the ends 2 and 3 will be moved toward one another so that the ring will be expanded and its diameter increased to enable it to be readily fitted over the end of a shaft or other cylindrical element and sprung into a groove 7 thereon wherein it will maintain its position indefinitely to serve as a fastener or other retaining element. When it is desired to remove the ring, the two ends 2 and 3 are gripped by the pliers to again expand the ring and enable it to be sprung out of the groove. When the ends 2 and 3 are brought toward one another by the pressure exerted upon them by the pliers, the movement of the ends 2 and 3 toward one another will be restricted by the abutment of the end 3 against the laterally-extended lug portion 5, with the result that the ring cannot be expanded to the breaking point during the act of placing it in position in a groove or removing it therefrom.

It will also be noted that the portions 3 and 5, which are engaged between the jaws of the pliers, extend beyond the periphery of the ring and hence these portions of the ring can be engaged by pliers brought into gripping position from directly over the ring, or by the pliers directed substantially parallel to the axis of the ring. This is of importance since very often rings of this character are placed in position between parts that are so closely spaced that the entry of a tool, unless the tool can be inserted by movement in a direction transversely of the axis of the ring, is very often impossible. With the ring of the described construction, the projecting elements of the ring intended for engagement by a tool to expand the ring, are so positioned that the engagement of the same by a pliers of almost any known construction is possible, and since the elements 3 and 5 can be gripped between the jaws of the tool, with the tool held either horizontally or vertically, the placement of the ring in position or its removal from operative position is simple and easily effected.

In the drawing, the ring is shown as being composed of a strip of metal of substantially uniform cross sectional shape. This enables the ring to be rolled or otherwise formed from strip stock. However, the ring may also be produced by stamping methods or by the distortion of a bar or strip so that the resultant ring might not necessarily be of uniform cross-sectional shape for its length. This and other modifications are considered as being within the scope of the present invention and the claims appended hereto.

What I claim is:

1. A retaining ring intended for reception in an annular groove of substantially uniform width, said ring having a body of circular shape and of a thickness at least as great as its width, said ring having the greater portion of its body in the same plane so that its side surfaces are substantially parallel, said ring having overlapping ends, one of said ends being in the same plane as the body of the ring, the second end being offset and out of the plane of the body of the ring and extending alongside of the first end, the second end having a lateral lug portion, the first end and the lateral lug portion of the second end constituting projections for engagement by a tool to enable the body of the ring to be expanded.

2. A retaining ring intended for reception in an annular groove in a shaft or other cylindrical element, said ring having a body of substantially circular shape and of a thickness at least as great as its width, said ring being of a normal diameter less than that of the part of the shaft in which the groove is formed so that the ring requires expansion for fitment into and removal from the groove, said ring having the greater portion of its body in the same plane with its side surfaces substantially parallel, said ring having an outwardly projecting end, a second end having a part offset from the body of the ring and extending out of the plane of the body of the ring and alongside the body of the ring and having an end bent inwardly and across the outer face of the body of the ring near the first end, the two ends constituting gripping elements for engagement by a tool to expand the ring by pressure of said ends in a direction toward one another.

3. A retaining ring composed of a strip of metal of substantially uniform thickness for its entire length, said ring having a loop portion in the same plane for the greater portion of its circumference, said loop portion having an angularly-extending end located in the same plane as the loop portion, the loop portion having a second end offset from the loop and extending alongside of a part of the loop, the latter end terminating in a tip bent laterally over the outer face of the loop near the first end.

4. A retaining ring composed of a strip of metal at least as thick as it is wide, said ring having a loop in the same plane for more than one-half of its circumference, said loop having two overlapped ends, one of which extends angularly to the loop but is in the same plane as the loop and the second end having an offset part extending alongside a portion of the loop and out of the plane of the loop, the latter end terminating in a tip extended laterally to the offset part, said tip being located near the angular end whereby said end and tip constitute gripping elements for engagement by a tool to expand the ring by pressure of said elements toward one another.

JULES J. BRELL.

REFERENCES CITED

The following references are of record in the file of this patent:

UNITED STATES PATENTS

| Number | Name | Date |
|---|---|---|
| 2,081,677 | O'Neill | May 25, 1937 |
| 2,082,315 | Williams | June 1, 1937 |
| 2,181,271 | Arras | Nov. 14, 1939 |
| 2,472,172 | Ovens et al. | June 7, 1945 |

FOREIGN PATENTS

| Number | Country | Date |
|---|---|---|
| 461,048 | Great Britain | Feb. 9, 1937 |
| 481,970 | Great Britain | Mar. 22, 1938 |